(12) United States Patent
Gnanamani et al.

(10) Patent No.: US 8,041,715 B2
(45) Date of Patent: Oct. 18, 2011

(54) SPONSORED SEARCH RESULTS RE-RANKING BASED ON LINKING ASSOCIATIONS

(75) Inventors: Arun Kumar Gnanamani, Mountain View, CA (US); Evgeniy Makeev, West Linn, OR (US)

(73) Assignee: Yahoo! Inc., Sunnyvale, CA (US)

( * ) Notice: Subject to any disclaimer, the term of this patent is extended or adjusted under 35 U.S.C. 154(b) by 413 days.

(21) Appl. No.: 12/410,037

(22) Filed: Mar. 24, 2009

(65) Prior Publication Data

US 2010/0250527 A1 Sep. 30, 2010

(51) Int. Cl.
*G06F 7/02* (2006.01)
*G06F 17/27* (2006.01)
(52) U.S. Cl. ...................... 707/726; 707/735
(58) Field of Classification Search .................. 707/2, 5, 707/999.002, 999.005, 726, 735
See application file for complete search history.

(56) References Cited

U.S. PATENT DOCUMENTS

| 2005/0076097 A1* | 4/2005 | Sullivan et al. | 709/218 |
| 2007/0192314 A1* | 8/2007 | Heggem | 707/5 |
| 2009/0210409 A1* | 8/2009 | Levin | 707/5 |

OTHER PUBLICATIONS

Yahoo Rolls Out Relevancy Ranking on Paid Search, retrieved Mar. 13, 2009, from http://outofmygord.com/archie/2007/01/23/Yahoo-Roles-Out-Relevancy-Ranking-on-Pai . . . (2 pages).

* cited by examiner

*Primary Examiner* — James Trujillo
*Assistant Examiner* — Bruce Moser
(74) *Attorney, Agent, or Firm* — Nathan O. Greene; Brinks Hofer Gilson & Lione

(57) ABSTRACT

A computer-implemented system and methods of re-ranking sponsored search results by a search engine in response to a search query include: retrieving one or more organic search results and a plurality of sponsored search results ("search results"), along with their respective rankings, associated with a search query; determining a degree of association between each sponsored search result and the other search results through analyzing web links between the search results and other web documents to or from which the search results are at least indirectly linked; calculating a clustering score for each sponsored search result based on their respective degrees of linking association; generating a new ranking score for each sponsored search result based on their respective clustering scores and rankings; and re-ranking, and storing in memory, the plurality of sponsored search results based on the new ranking scores of each respective sponsored search result.

27 Claims, 6 Drawing Sheets

FIG. 4

SPONSORED SEARCH RESULTS RE-RANKING BASED ON LINKING ASSOCIATIONS

BACKGROUND

1. Technical Field

The disclosed embodiments relate to the ranking of both sponsored and organic search results on a search results page, and more particularly, to re-ranking sponsored search results based on linking associations between organic and sponsored search results and other associated web documents.

2. Related Art

Today, major Internet search engines such as Yahoo! of Sunnyvale, Calif. and Google of Mountain View, Calif., generally deliver sponsored search results primarily by order of which advertiser pays the most per click (PPC) or per action (PPA), etc., although relevancy now plays a role in some ranking models. Accordingly, the first-listed sponsored search results (or sponsored advertisements) are owned by advertisers that have bid the highest in an online auction for that first-listed sponsored search result position, subject to some relevancy-based adjustments at the time of delivering the sponsored search results to the search results page. As advertisers (or bidders) bid less, they are usually listed in positions farther down the search results page, which may mean being removed from the north (or top) ad positions to the east (or right) ad positions, or being moved from the east ad positions to the south (or bottom) ad positions. Again, this is subject to any relevancy-based adjustments in some models for delivery of sponsored search results.

The model for listing sponsored search results just described, however, does not necessarily result in the highest number of clicks on any given sponsored search result listing, and the Internet search engines wish to maximize such clicks to increase their revenue. Furthermore, sponsored search advertisers often submit listings that provide less information than would be necessary to assure good relevancy when they are being delivered in response to specific search queries. Higher click rates may be obtainable if the highest-listed sponsored search results also were more relevant to the search query term(s) in response to which they are delivered to the search results pages of the search engine.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the present disclosure. In the drawings, like referenced numerals designate corresponding parts throughout the different views.

FIG. 4 is a diagram of an exemplary search results page displaying redundancy of certain search results within the organic and sponsored search results.

DETAILED DESCRIPTION

Figure 1:
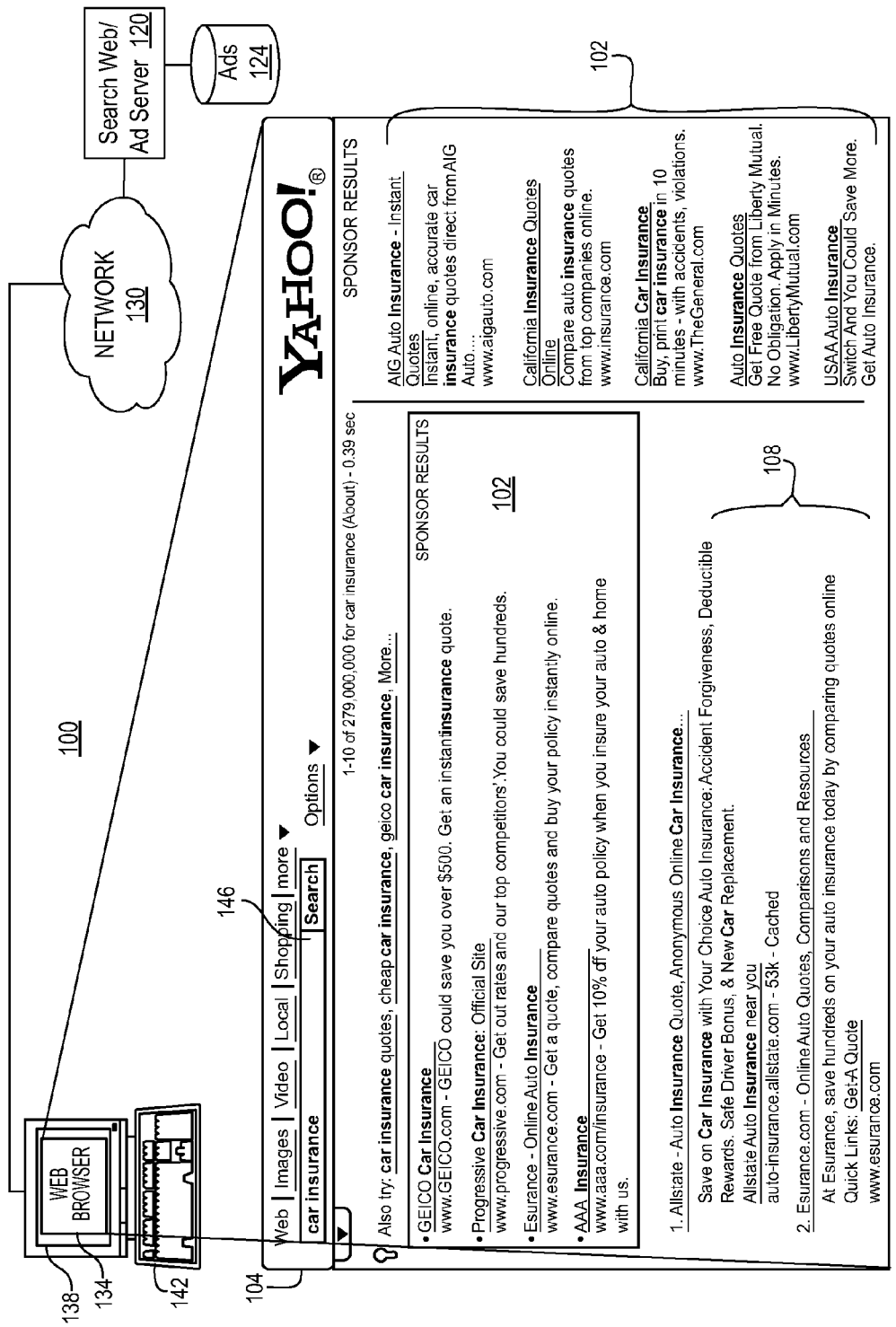
FIG. 1 is a block diagram of an exemplary prior art system that delivers sponsored search results at least partially according to bid amounts, the highest to the north (top) ad positions, and lower positions to the east (right) and south (bottom).

By way of introduction, included below is a system and methods for re-ranking sponsored search results based on linking associations between organic and sponsored search results, and other associated web documents. In order to improve relevancy of sponsored search results, a search engine may benefit from using information beyond that supplied by the advertisers to rank the sponsored search results. Accordingly, a hybrid of bid amount and relevancy-based ranking may be employed by the search engine when listing the sponsored search results. As mentioned, this increases the number of clicks and actions on the sponsored search results, which increases revenue for the search engines. As a further consequence, advertisers (or bidders) that own the sponsored search result listings are motivated to bid on the most relevant terms for their websites so that, despite bidding lower amounts, may be ranked even higher. This could be referred to as a relevancy-based increase in ranking for advertisers, which would benefit the advertisers, the search engine, and Internet searchers wanting access to the most relevant results. Some current models used by search engines integrate relevancy considerations into ranking of sponsored search results.

By using the content of the entire World Wide Web ("Web") or Internet, and the location of an advertiser listing in this space along with locations of other sponsored and organic search results, relative linking between documents create associations that inform relevancy. Sponsored search advertisements are usually served (and displayed) on a page with organic (or web-based) search results when delivered by the search engine. While sponsored search and web search employ different algorithms and matching technologies, ultimately a sponsored search result includes a uniform resource locator (URL), or website hyperlink, to an advertiser web page as do organic search results. This web page is included within the content of the entire Web, which may be graphed according to linking relationships or associations. That is, as part of the web search space, every advertised page has certain relationships with other documents and pages served as a part of the web search results. Knowing and leveraging these relationships helps to rank the sponsored search results more precisely and assure their correspondence to the organic search results on the rest of a search result page, as well as their appropriate placement on the page.

Most existing sponsored search matching technologies act independently, without interacting with other matching technologies, or without regard to linking associations between search results and/or other web documents. The disadvantage, accordingly, includes delivering the same results by each matching technology, and thus failing to provide broader sets of sponsored search results since the duplicates take the space which could be otherwise available for additional unique results. It would be advantageous, therefore, to provide an overarching ranking model that finds associations between the results from different matching technologies, working with the content of as much of the Web as possible, to provide a better result from the point of view of Internet users or searchers.

The most popular pricing model for search engine marketing today is the pay-per-click (PPC) model. Under this model, the advertiser pays the search engine a certain amount only when a searcher has clicked on an advertisement (ad) or sponsored link of the advertiser and landed on a (landing) page associated with the ad or sponsored link. The search engine is not paid if the searcher leaves the results page without clicking or clicks on an organic link, no matter where the organic link subsequently lands. Other pricing models exist, including pay-per-impression (PPI), where an advertiser pays every time their ad is displayed, and pay-per-action (PPA), where advertisers only pay if the ad results in a sale or other action.

In the PPC pricing model, the amount paid by an advertiser for each click is typically determined by an auction process. Advertisers place bids on a search phrase, and the position of their ad on the search results page is associated with their own bid in relation to the bids of other advertisers. In the present embodiments, the ranking of sponsored search results may be re-ordered based on relevancy-based determinations derived from linking associations of other web documents, including organic search results delivered at the same time as the sponsored search results. Each sponsored search ad has one or more bid phrases associated with it. In addition to bid phrases, advertisements also have a title as a hypertext link, usually displayed in bold font, and an abstract or creative, which includes a few lines of text—usually shorter than 120 characters—displayed on the page. Each ad also contains a uniform resource locator (URL) to the advertised web page, which is called the landing page.

A search query is any text a user has typed into a search box of a search engine. In this context, sometimes "search query" can refer to a phrase that matches one or more sponsored bids. A search query does not need to be the exact phrase for which an advertiser bid. For example, an advertiser may bid on the phrase 'tennis shoes' using a broad match option where queries are matched against ads using a broader criterion. A broad match bid could result in delivering of the sponsored ad to many relevant search queries that may not contain the exact bid phrase. In this example, the advertiser's ad may appear in matched search queries such as 'sport shoe,' 'tennis sneakers,' 'running shoes,' and so on.

FIG. 1 is a block diagram of an exemplary prior art system 100 that delivers sponsored search results 102 at least partially according to bid amounts, the highest to the north (top) ad positions, and lower positions to the east (right) and south (bottom) of a search results page 104. As discussed above, however, current systems may also incorporate some relevancy-based factors when ranking sponsored search results 102 prior to delivery to the search result pages 104. Also included on the page 104 are organic (or web-based or free) search results 108. The organic search results 108 and the sponsored search results 108, 102 are delivered by a search web/ad server 120, also referred to herein as a search engine 120, to the search results page 104 in response to a search query. The positions of sponsored search results 102 are variably referred to by their cardinal locations: north, east, and south. These locations respectively refer to the top, right, and bottom of the search results page 104. Additional columns of sponsored search results 102 may be employed as disclosed in U.S. patent application Ser. No. 12/396,163, entitled OPTI-MIZED SEARCH RESULT COLUMNS ON SEARCH RESULTS PAGES, filed Mar. 3, 2009, which is herein incorporated by reference.

The sponsored advertisements 102 may be indexed and stored in an ad database 124 of the search engine 120, and delivered over a network 130 such as the Internet, the Web, a local area network (LAN), a wide area network (WAN), or other network. The web search page 104 may be displayed on a web browser 134 of a monitor 138 (or other display device) of a computing or communication device 142 such as a personal computer. The computing or communication device 142 may be a computer, a personal digital assistant ("PDA"), a smart phone such as the Blackberry by Research in Motion (RIM) or iPhone by Apple, a mobile internet phone or device, a laptop, etc. The search query submitted by the user in a search box 146 of the search results page 104 embodies the user's intent, and is the main trigger for selecting ads to display from the ad database 124, which are then listed as sponsored advertisements 102. Additionally, ads may be delivered based on user search behavior, or based on an analysis of the organic search results 108.

Figure 2:
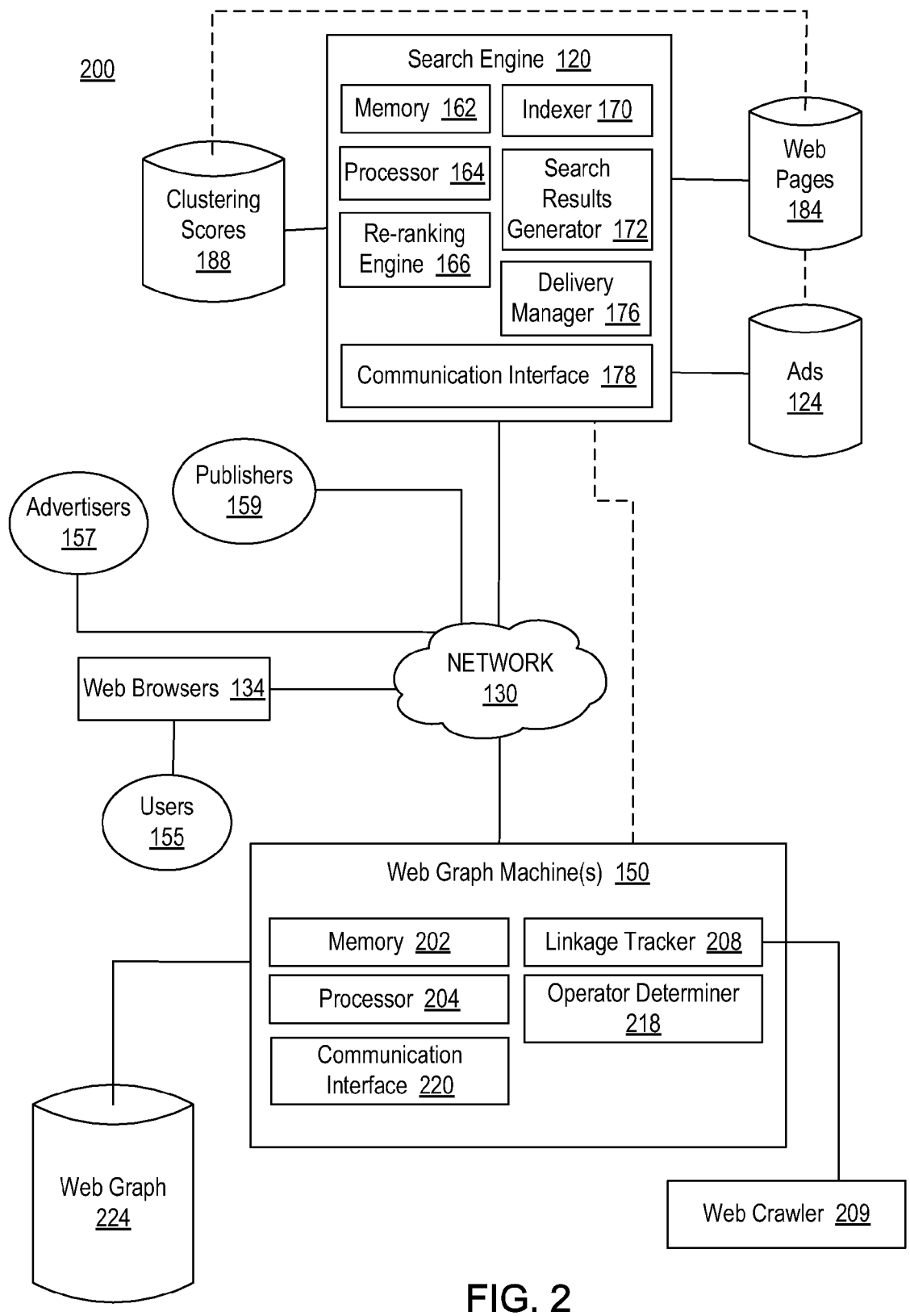
FIG. 2 is a block diagram of an exemplary network system for re-ranking sponsored search results based on linking associations between organic and sponsored search results and other associated web documents.

FIG. 2 provides a view of a network system in which the present system and methods may be implemented. Not all of the depicted components may be required, however, and some systems may include additional, different, or fewer components not shown in FIG. 2. Variations in the arrangement and type of the components may be made without departing from the spirit or scope of the claims as set forth herein.

FIG. 2 is a block diagram of an exemplary network system 200 for re-ranking sponsored search results 102 based on linking associations between organic and sponsored search results 108, 102 and other associated web documents. Some of the components of the system 100 introduced above may exist within this exemplary system 200. In particular, the system 200 includes the search engine 120 and one or more web graph machines 150 as well as a plurality of users 155, advertisers (or bidders) 157, and publishers 159 that all communicate over the network 130 or Internet. The users 155 communicate through the web browsers 134 on computing devices 142, such as those discussed above.

The search engine 120 may include a memory 162, a processor 164, a re-ranking engine 166, an indexer 170, a search results generator 172, a delivery manager 176, and a communication interface 178. Additionally, the search engine 120 includes the ad database 124, a web pages database 184, and a clustering scores database 188. All of these components may be coupled with each other. Herein, the phrase "coupled with" is defined to mean directly connected to or indirectly connected through one or more intermediate components. Such intermediate components may include both hardware and software based components. Each of the one or more web graph machines 150 may include a memory 202, a processor 204, a linkage tracker 208, which may be coupled with a Web crawler 209, an operator determiner 218, and a communication interface 220. The one or more web graph machines 150 may also include a web graph database 224. All of these components may be coupled with each other. Likewise, the search engine 120 and the one or more web graph machines 150 may be coupled with each other over the network, or may be integrated together within the search engine 120. Various databases described herein may also be coupled with each other and provide for a distributed data processing system and storage system.

The web pages stored in the web pages database 184 may include landing pages associated with various advertisement listings stored in the ad database 124, both of which may be stored in relation to each other in a single database. The search engine 120 receives a search query from a user 155 through the communication interface 178. The processor 164 in conjunction with the search results generator 172 locates the most relevant web pages (organic listings 108) and advertisements (sponsored ads 102, 108) to return to the search results page 104 in response to search query, as displayed in FIG. 1.

In various algorithms of the embodiments disclosed herein, organic search results 108 will be referred to as "O" and sponsored search results 102 will be referred to as "S." Furthermore, the web graph is a graph with each document (or web page) in at least a portion of the Web being represented by a node and an edge between two nodes if there is a link between the two documents. Web documents found in the web graph that link to or from a sponsored search result 102 or an organic search result 108, directly or indirectly, will be referred to as "U."

The one or more web graph machines 150 communicate with the search engine 120 or are otherwise coupled with the search engine 120, making the web graph of the Internet referred to herein available to the search engine 120. The web graph database 224 may also be saved in disk storage (memory) found local to the search engine 120 and may be a web graph specifically designed to optimize efficient return of operator values related to interlinking associations of sponsored search results 102, organic search results 108, and other web documents, which will be explained below. Because the Web is so expansive, more than one Web graph machine 150 may be used for storage of the web graph, and these machines 150 may need to be coupled to each other, either directly or over the network 130, so that cross-linking between portions of the web graph stored on different computers may be maintained and tracked.

For each of a large plurality of search queries, the search engine may perform analysis, which includes a number of algorithms, in order to determine a more optimal ranking for the sponsored search results 102. The search engine 120 first runs a normal search for the search query, which generates a ranked set of organic search results 108 and a ranked set of sponsored search results 102. Both the organic and/or the sponsored search results 108, 102 may extend to one or more pages, wherein each search result page 104 typically lists about ten to twelve sponsored search results 102 and about ten organic search results 108. The search results 102, 108 are delivered to the web graph, e.g., whether the web graph is stored within the web graph machines 150 or local to the search engine 120. The operator determiner 218 of the web graph machines 150 then determines an operator value for each of a number of operators—discussed in detail with reference to FIG. 3—that depend on linking association of the organic search results 108, the sponsored search results 102, and other web documents from or to which are linked the organic and sponsored search results 108, 102.

The linkage tracker 208 ensures that the web documents and the search results 102, 108 have proper links therebetween, and makes periodic updates to make sure the links are active where present, are absent after deletion, and present after addition, etc. The linkage tracker 208 may be a Web crawler or may work in conjunction with the Web crawler 209 to test web links. For instance, the linkage tracker may receive updates from the Web crawler 109 regarding the latest web link changes (additions, removal, or revisions), and send the updates to the web graph to ensure that the current state of the Web is reflected as close as possible in the stored web graph.

A Web crawler (also referred to as a spider, robot, or automatic indexer) is a computer program that browses the Web in a methodical, automated manner. It accesses web pages and content on those web pages, especially content that may relate to relevancy. Web crawlers are mainly used to create a copy of all the visited pages for later processing by the search engine 120, which will index the downloaded pages to provide fast searches. Crawlers can also be used for automating maintenance tasks on a web site, such as checking links or validating HTML code.

Operator values based on relative linking between search results and web documents are obtained from the web graph machines 150, which then send the operator values to the search engine 120 through its communication interface 220. The search engine 120 retrieves the operator values through its communication interface 178, and the processor 164 and/or the re-ranking engine 166 proceeds to calculate a clustering score for each sponsored search result 102 based on the operator values, as described below. Each clustering score may be stored in the clustering scores 188 database, or directly in the web pages and/or advertisement databases 184, 124 in relation to each respective sponsored search result 102. The re-ranking engine 166 then uses the original ranking of each sponsored search result 102 and combines with it the clustering score just calculated to produce a new ranking score for each respective sponsored search result 102. The search engine 120 then re-orders the sponsored search results 102 according to the new ranking score to produce a re-ranked plurality of sponsored search results 102.

The delivery manager 176 communicates with the re-ranking engine 166 to obtain a re-ranked listing of the sponsored search results 102, if available. It is the re-ranked listing that is delivered to the search results page 104 of the browser 134 of the user 155. The delivery manager 176 ensures proper formatting and works with the communication interface 178 to ensure proper delivery of the re-ranked sponsored search results 102 to the web browser 134 in response to submission of the search query. The delivery manager 178 may also ensure proper positioning of multiple columns of sponsored search results 102 relative to the organic search results 108 as disclosed in incorporated U.S. patent application Ser. No. 12/396,163, filed Mar. 3, 2009

Figure 3:
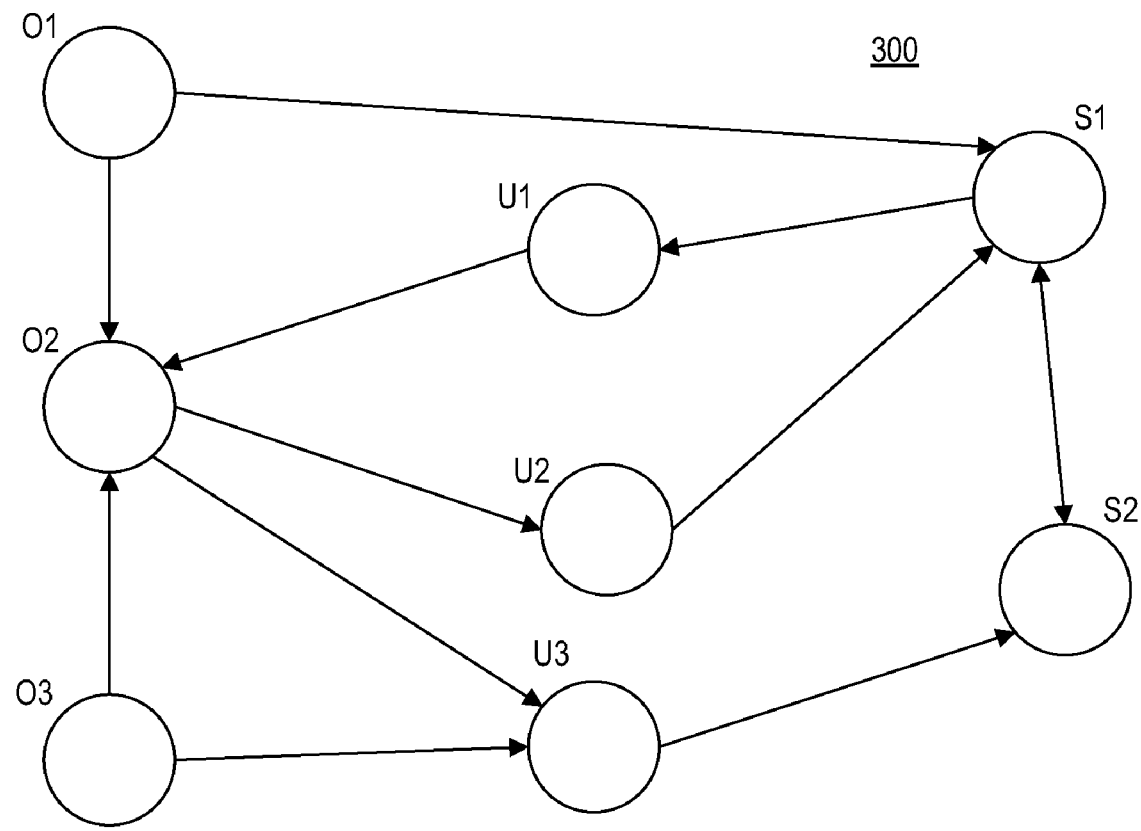
FIG. 3 displays a diagram of an exemplary sub-graph of a web graph for purposes of explaining the determination of operator values of the web graph.

FIG. 3 displays a diagram 300 of an exemplary sub-graph of the web graph for purposes of explaining the determination of operator (f) values of the web graph. The following are operators, which are functions that can be applied to a pair of nodes on any sub-graph of the web graph, to calculate a metric needed to determine a clustering score, which is described below. Table 1, below, discloses and explains four possible operators that may be used in various embodiments of the present disclosure.

TABLE 1

| Operator Name (f) | Explanation |
|---|---|
| Common Vertices $(u_1, u_2)$ | Gives a number of web page documents having a link to both the documents (nodes) $u_1$ and $u_2$. |
| Reachable Vertices $(u_1, u_2)$ | Gives a number of web page documents having a link to both nodes $u_1$ and $u_2$ through other web documents, with not more than a Maximum number of nodes between $u_1$ and $u_2$. |
| Edge Distance $(u_1, u_2)$ | Gives a number based on the inverse of a shortest path between the nodes $u_1$ and $u_2$, which is 1 where $u_1 = u_2$. |
| NumPaths $(u_1, u_2)$ | Give a number of distinct paths between the nodes $u_1$ and $u_2$. |

The explanation for Reachable Vertices includes a limitation of the number of nodes between any possible path between $u_1$ and $u_2$ because the Web is so expansive, consideration of longer paths has little usefulness, or at least quickly diminishing returns. The number of nodes set as the Maximum number may be determined randomly or based on experimentation.

By way of example, FIG. 3 displays three organic search result (O) nodes, three web document (U) nodes, and two sponsored search results (S) nodes. These eight nodes are interlinked in some way with each other, therefore being placed into consideration for determination of an operator value. The web documents within U include a link to or from one or more of the search results 108, 102. Table 2 below contains the results of evaluation of the sub-graph of FIG. 3 in terms of the operators of Table 1 for the pair of nodes ($O_2$, $S_1$).

TABLE 2

| Operator Name (f) | Result & Explanation |
| --- | --- |
| Common Vertices ($O_2$, $S_1$) | 1 (O1 is the single common vertex to both $O_2$ and $S_1$) |
| Reachable Vertices ($O_2$, $S_1$) | 2 (U3 and S2 each link through each other to link between both $O_2$ and $S_1$) |
| Edge Distance ($O_2$, $S_1$) | ½ (the shortest path between $O_2$ and $S_1$ is two: $O_2$-$U_2$ and $U_2$-$S_1$) |
| NumPaths ($O_2$, $S_1$) | 2 (the number of paths between $O_2$ and $S_1$ is two: $O_2$-$U_2$-$S_1$ and $O_2$-$U_3$-$S_2$-$S_1$) |

A few other terms are disclosed as described in Table 3 in order to describe determination of function and clustering scores as per the below-discussed algorithms.

TABLE 3

| Term | Explanation |
| --- | --- |
| pos(r) | Position or rank of the result within its set (O or S) that has been served for the query, q. |
| |N| | Number of elements in set O or S. |
| RankWeightOrganic | A weight given to a result based on it being an organic search result. |
| RankWeightSponsored | A weight given to a result based on it being a sponsored search result. |
| WO(f) | Weight of Operator, which is a scalar weight applied to an operator value to normalize each operator (f) to each other. |

The RankWeightOrganic and RankWeightSponsored weights may be set after some experimentation and comparison for generating the best re-ranked results. For instance, the RankWeightOrganic may be set as 1.5 and the RankWeightSponsored may be set at 1.0 or something close to 1.0, and then these numbers could be adjusted by a search engine provider based on which weights produce higher clicking rates.

A clustering score is a number that gives a degree of relationship between a web document (u) and the rest of the nodes within a result set of sponsored and organic search results 102, 108. The degree of relationship is based on the closeness of the distance between the web document and the other result nodes in the web graph and the number of nodes in the various paths between the web document and the other result nodes. For purposes of the disclosed embodiments, the web document for which the clustering score is calculated is each sponsored search result 102, although the present embodiments could be applied to organic search results 108 as well. The clustering score is then used to re-rank the sponsored search results 102, thus adding relevancy-based factors to their respective new ranking scores.

Calculation of the clustering score includes first calculating a function score between each of the possible pairs of nodes in S and O and each value of an operator (f), as follows:

$$\Sigma((f(u,o) \times RankWeightOrganic)/(1+\log(pos(o))))/|O|,$$
$$\text{for each } o \text{ in } O + \Sigma((f(u,s) \times RankWeightSponsored)/(1+\log(pos(s))))/|S|, \text{ for each } s \text{ in } S, \quad (1)$$

where f is one of the operators disclosed in Table 1 above. Other terms are disclosed in Table 3 above. Equation 1 reflects the fact that the lower the pos(r) value, the better the original ranking, and thus the higher the overall function score. The $(1+\log(pos(o)))$ and $(1+\log(pos(s)))$ values are still just a component, however, of each function score. The overall clustering score, based on the function scores calculated in Equation 1, are determined as $$\Sigma(FunctionScore(f,u) \times WO(f)) \quad (2)$$

for each function score from each operator within a set of possible operators. The operators of Table 1 are exemplary and others could be included within this set of possible operators. Furthermore, the set O could be very large, so the number of sponsored search results 102 used in the calculation of Equations 1 and 2 may be limited to the first 20, or some other predetermined number.

Next, the re-ranking engine 166 of the search engine 120 re-ranks the sponsored search results 102 based on the clustering scores, which represents the relevancy of each respective sponsored search result. The original rankings act as weights applied to the clustering scores of each respective sponsored search result 102, to generate a new ranking score for each sponsored search result 102. In other embodiments, the clustering scores may be used by themselves without regard to the original rankings. The net result of re-ranking includes pushing down (e.g., to a lower rank) sponsored search results that are loosely connected with the other results while moving up to higher-ranked positions those sponsored search results that are tightly connected with other search results 108, 102. Accordingly, the sponsored search results 102 matching the same or similar query intent are grouped together, and are likely more relevant, so are ranked higher during re-ranking thereof.

While the above algorithms are preferably run offline, so that the search engine 120 is prepared to re-rank large volumes of search queries before they are submitted by users 155, modified algorithms may be run online at run time—upon receipt of a search query—with certain levels of success. Because consideration of large volumes of nodes within the web graph produces the best relevancy-based results, a run-time analysis of the web graph would have to be scaled back to consideration of neighboring nodes only. Certain limitations would have to be set as to the separation of node pairs and the number of nodes between a web document and one of the nodes in the pair before an online process could consider it. Accordingly, the accuracy of an online estimation of the algorithms above would be degraded to greater or lesser degrees depending on the search query, but would still be an option in some embodiments, especially for rarer queries for which re-rankings are not prepared offline, in advance.

Similarly, instead of considering the actual result in each of sets O and S, the search engine 120 could just consider the domain names (or homepages) of the results and repeat the calculation of the clustering score and re-ranking of the results as described above. In this way, the re-ranking is generalized and some redundancies within deeper pages of an advertiser website may be eliminated, although perhaps at a cost of reducing the accuracy of re-ranking. In this embodiment, consideration of domain names is especially useful for those domains that do not have very many web documents for that domain, e.g., for small business sites, in which there would be little risk of over generalization.

The clustering score from Equation 2 gives the degree of association with other search results 102, 108, as discussed. Accordingly, in sum, a higher clustering score indicates that the sponsored search result more closely correlates to other search results 102, 108 delivered to the user 155 in response to a query than a low clustering score. Furthermore, if the extent clustering scores are both high and close to each other within a confined range, the sponsored search results 102 are strongly related to the other search results 102, 108.

The correlation between all search results 102, 108 is not, however, the same. For example, a sponsored search result 102 that has a clustering score closer to the first-listed organic search result 108 is more significant than it being closer to the seventh sponsored search result 102. Accordingly, weights may be applied depending on which set the result is in (O or S) and as a function of the relative rank of the result within the set of results (O or S, respectively), as discussed above with reference to the RankWeights and pos(r) terms. Also, one operator (like Edge Distance) is more important than NumPaths, considering the size of the Web, in referring to the tightness of association between sponsored search results. Accordingly, the operators may also be weighted when combining the scores from different operators, as discussed with reference to WO(f) above.

Figure 4:
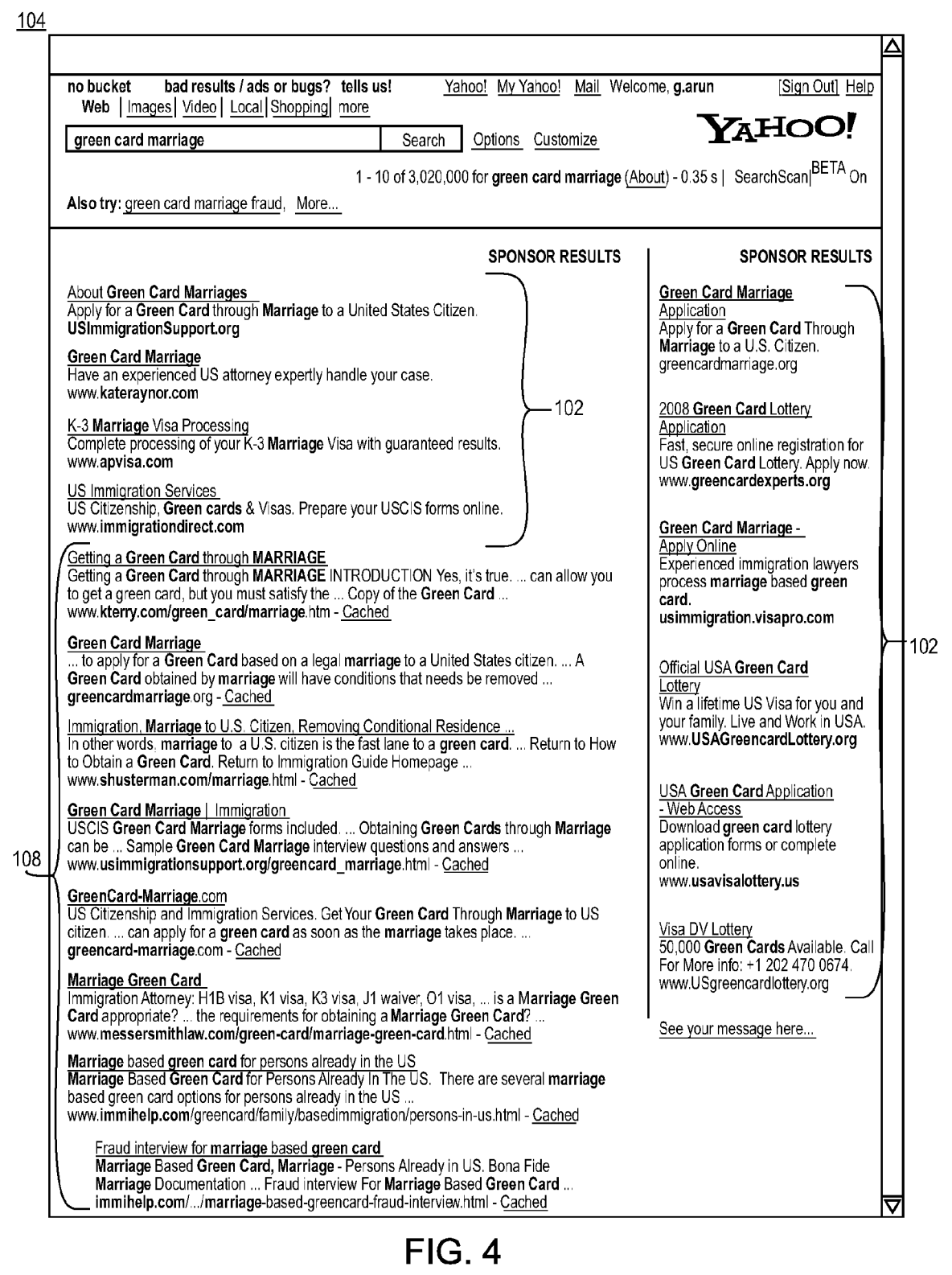

FIG. 4 is a diagram of an exemplary search results page 104 displaying redundancy of certain search results within the organic and sponsored search results 108, 102. This is a simplified example only to show the power of using the operators of Table 1 to determine the clustering score, which is then used for re-ranking. Note that the second organic search result 108 and the fifth sponsored search result 102—counting first from the north positions, then the east positions—are identical, namely greencardmarriage.org. Just from inspection of the fifth sponsored search result 102, it is much more relevant when compared with the third (apvisa.com) and fourth (immigrationdirect.com) sponsored search results 102 considering the query of "green card marriage."

The execution of the algorithms of Equations 1 and 2 come to the same result, wherein the clustering score for the fifth sponsored search result 102 would be high due to having high operator values since the fifth sponsored search result is the same node as the second organic search result. That is, because the pair being analyzed is the same node (u) in the web graph, Common Vertices would include all nodes that link directly to u, and Reachable Vertices would include all nodes that reach u thru other nodes, potentially very high numbers. Furthermore, the value for NumPaths will be the number of self-contained loops that start and end from the node, u. For instance, in FIG. 3, the path O2-U2-S1-U1-O2 is a self-contained loop. This would also be a high number. Finally, Edge Distance is 1 as explained in Table 1, the highest value for that operator. Accordingly, during re-ranking, the fifth position ranking of the fifth sponsored search result will be added to the higher clustering score to move it up above at least the third and fourth sponsored search results.

Figure 5:
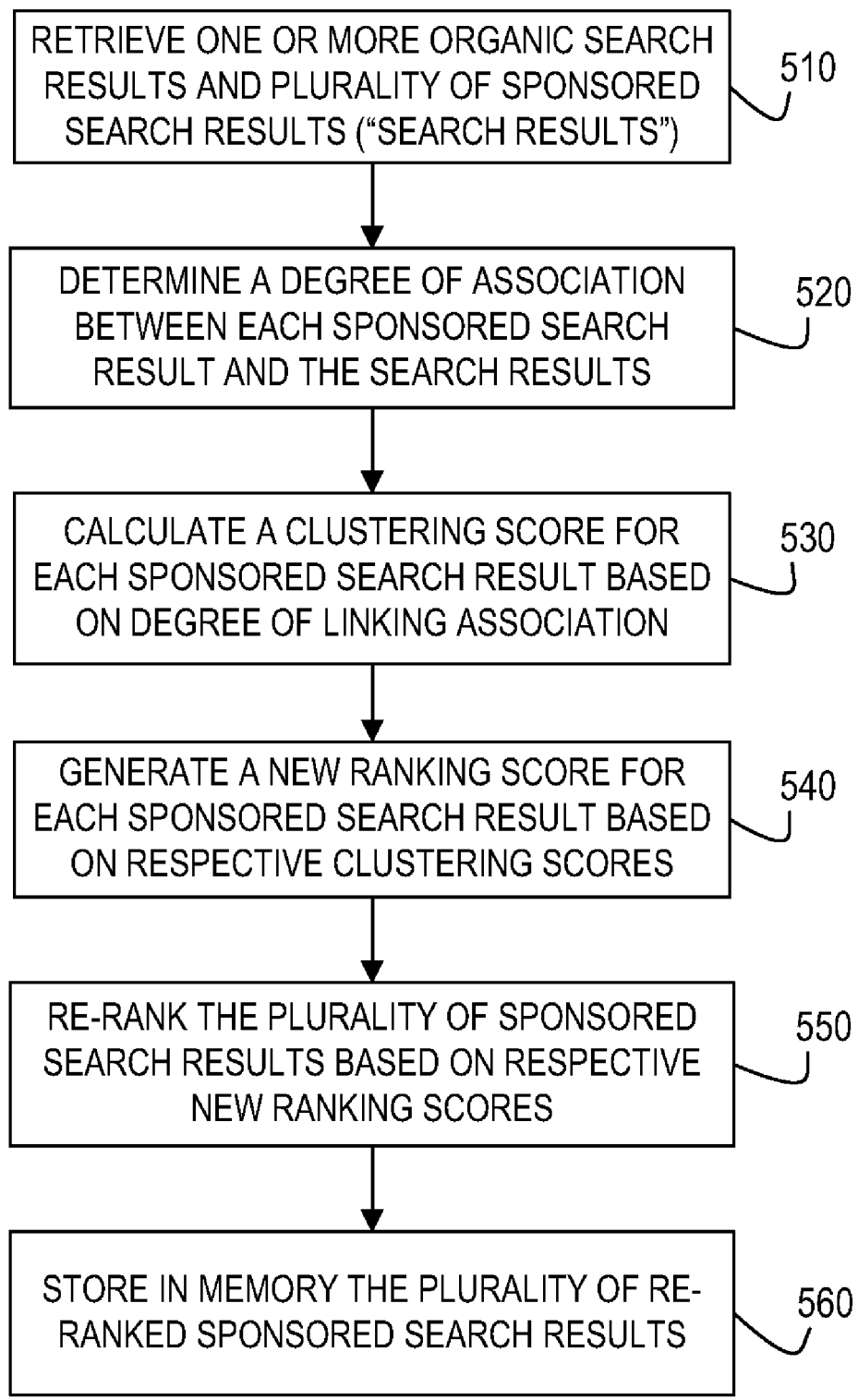
FIG. 5 is a flow diagram of a method for re-ranking sponsored search results by a search engine based on linking associations between organic and sponsored search results and other associated web documents.

FIG. 5 is a flow diagram 500 of a method for re-ranking sponsored search results by a search engine 120 based on linking associations between organic and sponsored search results 108, 102 and other associated web documents. At block 510, the search engine 120 retrieves one or more organic search results and a plurality of sponsored search results ("search results"), along with their respective rankings, associated with a search query. At block 520, the search engine 120 determines a degree of association between each sponsored search result and the other search results through analyzing web links between the plurality of sponsored search results, the one or more organic search results, and other web documents to or from which the search results are at least indirectly linked. At block 530, the search engine 120 calculates a clustering score for each sponsored search result based on their respective degrees of linking association. At block 540, the search engine 120 generates a new ranking score for each sponsored search result based on their respective clustering scores and rankings. At block 550, the search engine 120 re-ranks the plurality of sponsored search results based on the new ranking scores of each respective sponsored search result. At block 560, the search engine 120 stores in memory the plurality of re-ranked sponsored search results in relation to the search query.

Figure 6:
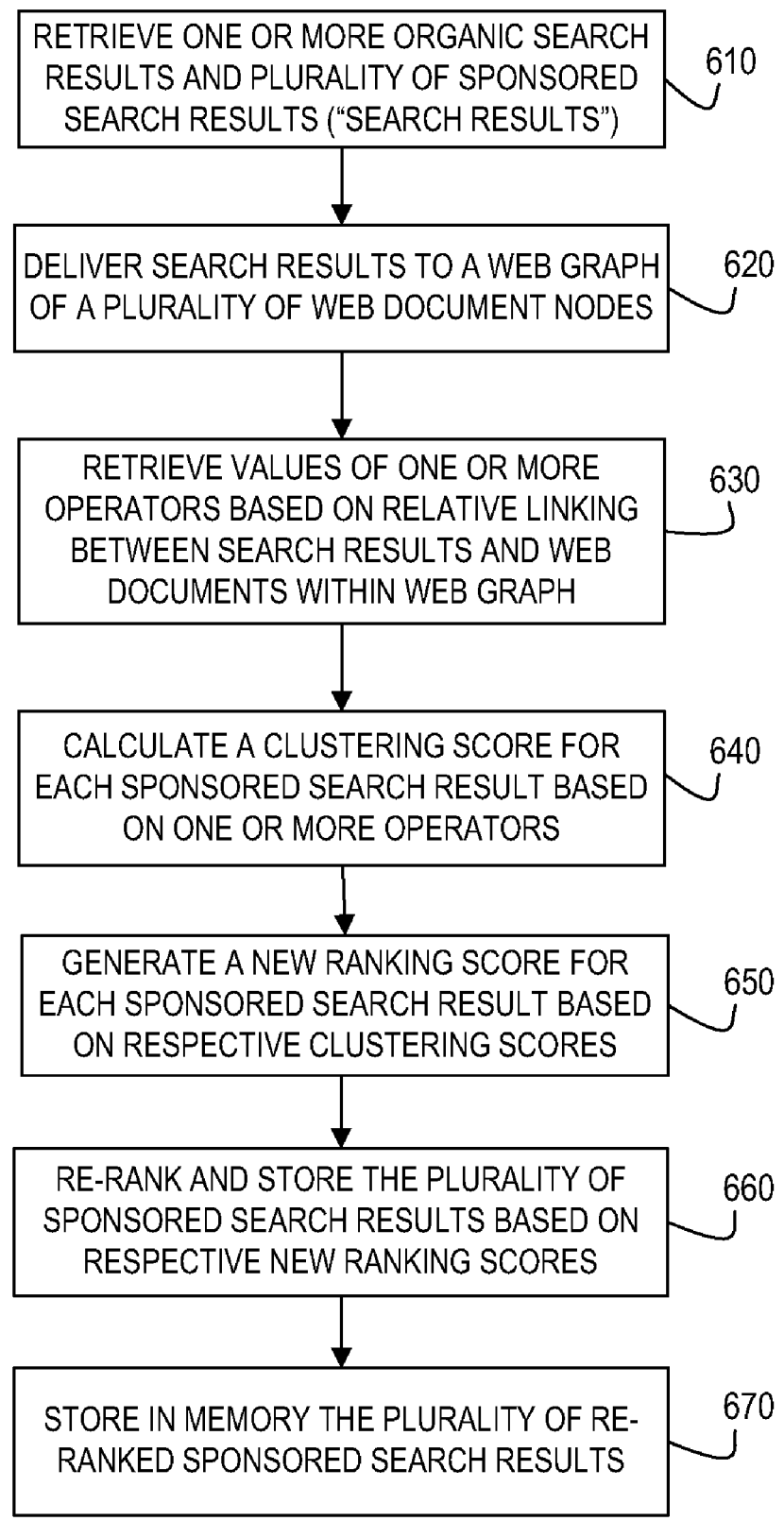
FIG. 6 is a flow diagram of another method for re-ranking sponsored search results by a search engine based on linking associations between organic and sponsored search results and other associated web documents.

FIG. 6 is a flow diagram of another method for re-ranking sponsored search results by a search engine 120 based on linking associations between organic and sponsored search results 108, 102 and other associated web documents. At block 610, the search engine 120 retrieves one or more organic search results and a plurality of sponsored search results ("search results"), along with their respective rankings, associated with a search query. At block 620, the search engine 120, delivers the search results to a web graph, wherein the web graph contains a plurality of interlinked web documents each represented by a node ($u_1, u_2, \ldots u_n$), and is stored on computer storage coupled with the search engine. At block 630, the search engine 120 retrieves values of one or more operators based on the relative linking within the web graph between the one or more organic search results, the plurality of sponsored search results, and any of the plurality of web documents. At block 640, the search engine 120 calculates a clustering score for each sponsored search result based on the one or more operators, wherein the clustering score indicates a degree of linking association between each sponsored search result and the other search results. At block 650, the search engine 120 generates a new ranking score for each sponsored search result based on their respective clustering scores and rankings. At block 660, the search engine re-ranks the plurality of sponsored search results based on the new ranking scores of each respective sponsored search result. At block 670, the search engine 120 stores in memory the plurality of re-ranked sponsored search results in relation to the search query.

The system and process described may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device may be designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method of re-ranking sponsored search results by a search engine in response to a search query, the method comprising:
   retrieving, by a search engine, one or more organic search results and a plurality of sponsored search results ("search results"), along with their respective rankings, associated with a search query;
   determining, by the search engine, a degree of association between each sponsored search result and the other search results through analyzing web links between the plurality of sponsored search results, the one or more organic search results, and other web documents to or from which the search results are at least indirectly linked;
   calculating, by the search engine, a clustering score for each sponsored search result based on their respective degrees of linking association;
   generating, by the search engine, a new ranking score for each sponsored search result based on their respective clustering scores and rankings;
   re-ranking, by the search engine, the plurality of sponsored search results based on the new ranking scores of each respective sponsored search result; and
   storing in memory, by the search engine, the plurality of re-ranked sponsored search results in relation to the search query.

2. The method of claim 1, further comprising:
   delivering the re-ranked plurality of sponsored search results to a user in response to the search query submitted by the user.

3. The method of claim 1, wherein re-ranking comprises moving a sponsored search result to a higher-ranked position if the sponsored search result is closely associated with at least another search result.

4. The method of claim 1, further comprising:
   delivering the search results, by the search engine, to a web graph, wherein the web graph contains a plurality of interlinked web documents each represented by a node $(u_1, u_2, \ldots u_n)$, and is stored on one or more computers coupled with the search engine; and
   retrieving, by the search engine, values of one or more operators based on the relative linking within the web graph between the one or more organic search results, the plurality of sponsored search results, and any of the plurality of web documents.

5. The method of claim 4, wherein the operator comprises Common Vertices, which is a function, $f(u_1,u_2)$, that provides a number of web documents that have a link to both web documents $u_1$ and $u_2$.

6. The method of claim 4, wherein the operator comprises Reachable Vertices, which is a function, $f(u_1,u_2)$, that provides a number of web documents that link to both web documents $u_1$ and $u_2$ through at least one other web document, but no more than a predetermined maximum number of nodes.

7. The method of claim 4, wherein the operator comprises Edge Distance, which is a function, $f(u_1,u_2)$, that generates an inverse of a shortest path between the web documents $u_1$ and $u_2$.

8. The method of claim 4, wherein the operator comprises NumPaths, which is a function, $f(u_1,u_2)$, that provides a number of distinct paths between the nodes $u_1$ and $u_2$.

9. The method of claim 4, further comprising:
   calculating a FunctionScore(f,u) between each of a possible pair of nodes within the plurality of sponsored search results (S) and the one or more organic search results (O), and the value of each operator (f), wherein the FunctionScore comprises $$\Sigma((f(u,o) \times \text{RankWeightOrganic})/(1+\log(\text{pos}(o))))/|O|,$$
for each o in $O + \Sigma((f(u,s) \times \text{RankWeightSponsored})/(1+\log(\text{pos}(s))))/|S|$, for each s in S, wherein RankWeightOrganic and RankWeightSponsored comprise normalizing weights applied to the organic and sponsored search results, respectively, and wherein pos(o) and pos(s) comprise the ranking of each organic and sponsored search result, respectively.

10. The method of claim 9, wherein calculating the clustering score of a sponsored search result comprises calculating $\Sigma(\text{FunctionScore}(f,u) \times WO(f))$ for each operator (f), wherein WO(f) comprises a scalar that normalizes each operator (f) to each other.

11. The method of claim 10, further comprising:
   limiting the number of sponsored search results used in the calculation steps to a specific number to be able to perform the calculations more quickly.

12. A computer-implemented method of re-ranking sponsored search results by a search engine in response to a search query, the method comprising:
   retrieving, by a search engine, one or more organic search results and a plurality of sponsored search results ("search results"), along with their respective rankings, associated with a search query;
   delivering the search results, by the search engine, to a web graph, wherein the web graph contains a plurality of interlinked web documents each represented by a node ($u_1, u_2, \ldots u_n$), and is stored on computer storage coupled with the search engine;

retrieving, by the search engine, values of one or more operators based on the relative linking within the web graph between the one or more organic search results, the plurality of sponsored search results, and any of the plurality of web documents;

calculating, by the search engine, a clustering score for each sponsored search result based on the one or more operators, wherein the clustering score indicates a degree of linking association between each sponsored search result and the other search results;

generating, by the search engine, a new ranking score for each sponsored search result based on their respective clustering scores and rankings;

re-ranking, by the search engine, the plurality of sponsored search results based on the new ranking scores of each respective sponsored search result; and storing in memory, by the search engine, the plurality of re-ranked sponsored search results in relation to the search query.

13. The method of claim 12, further comprising:
delivering the re-ranked plurality of sponsored search results to a user in response to the search query submitted by the user.

14. The method of claim 12, further comprising:
calculating a FunctionScore(f,u) between each of a possible pair of nodes within the plurality of sponsored search results (S) and the one or more organic search results (O), and the value of each operator (f), wherein the FunctionScore comprises $$\Sigma((f(u,o)\times RankWeightOrganic)/(1+\log(pos(o))))/|O|,$$
for each o in $O + \Sigma((f(u,s) \times RankWeightSponsored)/(1+\log(pos(s))))/|S|$, for each s in S, wherein RankWeightOrganic and RankWeightSponsored comprise normalizing weights applied to the organic and sponsored search results, respectively, and wherein pos(o) and pos(s) comprise the ranking of each organic and sponsored search result, respectively.

15. The method of claim 14, wherein calculating the clustering score of a sponsored search result comprises calculating $\Sigma(FunctionScore(f,u) \times WO(f))$ for each operator (f), wherein WO(f) comprises a scalar that normalizes each operator (f) to each other.

16. A computer-implemented system of re-ranking sponsored search results in response to a search query, the system comprising:

a search engine having a memory, a processor, and a communication interface through which the search engine retrieves one or more organic search results and a plurality of sponsored search results ("search results"), along with their respective rankings, associated with a search query;

an operator determiner coupled with the search engine to determine a degree of association between each sponsored search result and the other search results through analyzing web links between the plurality of sponsored search results, the one or more organic search results, and other web documents to or from which the search results are at least indirectly linked; and a re-ranking engine coupled with the operator determiner and the search engine to:
calculate a clustering score for each sponsored search result based on their respective degrees of linking association;

generate a new ranking score for each sponsored search result based on their respective clustering scores and rankings;

re-rank the plurality of sponsored search results based on the new ranking scores of each respective sponsored search result; and store in the memory the plurality of re-ranked search results in relation to the search query.

17. The system of claim 16, wherein the search engine delivers the re-ranked plurality of sponsored search result to a user in response to the search query submitted by the user.

18. The system of claim 16, wherein re-ranking comprises moving a sponsored search result to a higher-ranked position if the sponsored search result is closely associated with at least another search result.

19. The system of claim 16, further comprising:
one or more web graph machines having stored thereon a web graph, the one or more web graph machines coupled with the search engine, wherein the web graph contains a plurality of interlinked web documents each represented by a node ($u_1, u_2, \ldots u_n$); and wherein the search engine retrieves values of one or more operators from the one or more web graph machines based on the relative linking within the web graph of the one or more organic search results, the plurality of sponsored search results, and any of the plurality of web documents.

20. The system of claim 19, wherein the operator comprises Common Vertices, which is a function, $f(u_1,u_2)$, that provides a number of web documents that have a link to both web documents $u_1$ and $u_2$.

21. The system of claim 19, wherein the operator comprises Reachable Vertices, which is a function, $f(u_1,u_2)$, that provides a number of web documents that link to both web documents $u_1$ and $u_2$ through at least one other web document, but no more than a predetermined maximum number of nodes.

22. The system of claim 19, wherein the operator comprises Edge Distance, which is a function, $f(u_1,u_2)$, that generates an inverse of a shortest path between the web documents $u_1$ and $u_2$.

23. The system of claim 19, wherein the operator comprises NumPaths, which is a function, $f(u_1,u_2)$, that provides a number of distinct paths between the nodes $u_1$ and $u_2$.

24. The system of claim 19, wherein the re-ranking engine:
calculates a FunctionScore(f,u) between each of a possible pair of nodes within the plurality of sponsored search results (S) and the one or more organic search results (O), and the value of each operator (f), wherein the FunctionScore comprises $$\Sigma((f(u,o)\times RankWeightOrganic)/(1+\log(pos(o))))/|O|,$$
for each o in $O + \Sigma((f(u,s) \times RankWeightSponsored)/(1+\log(pos(s))))/|S|$, for each s in S, wherein RankWeightOrganic and RankWeightSponsored comprise normalizing weights applied to the organic and sponsored search results, respectively, and wherein pos(o) and pos(s) comprise the ranking of each organic and sponsored search result, respectively.

25. The system of claim 24, wherein the clustering score comprises $\Sigma(FunctionScore(f,u) \times WO(f))$ for each operator (f), wherein WO(f) comprises a scalar that normalizes each operator (f) to each other.

26. The system of claim 25, wherein the re-ranking engine limits the number of sponsored search results used in the calculation of the FunctionScores and the clustering score to a specific number.

27. A computer-implemented method of re-ranking sponsored search results by a search engine in response to a search query, the method comprising:
  retrieving, by a search engine, one or more organic search results and a plurality of sponsored search results ("search results"), along with their respective rankings, associated with a search query;
  delivering the search results, by the search engine, to a web graph, wherein the web graph contains a plurality of interlinked web documents each represented by a node ($u_1, u_2, \ldots u_n$), and is stored on computer storage coupled with the search engine;
  retrieving, by the search engine, values of one or more operators based on the relative linking within the web graph between the one or more organic search results, the plurality of sponsored search results, and any of the plurality of web documents;
  calculating, by the search engine, a clustering score for each sponsored search result based on the one or more operators, wherein the clustering score indicates a degree of linking association between each sponsored search result and the other search results;
  re-ranking, by the search engine, the plurality of sponsored search results based on the clustering scores of each respective sponsored search result;
  storing in memory, by the search engine, the plurality of re-ranked sponsored search results in relation to the search query; and
  delivering the re-ranked plurality of sponsored search results to a user in response to the search query submitted by the user.

* * * * *